United States Patent
Uphaus et al.

(10) Patent No.: US 7,150,204 B2
(45) Date of Patent: Dec. 19, 2006

(54) POSITIONING DEVICE FOR MOTOR VEHICLE STEERING COLUMNS

(75) Inventors: Ludger Uphaus, Neuenkirchen-Vörden (DE); Kai-Uwe Grams, Cappeln (DE); Holger Horstmann, Harpstedt (DE)

(73) Assignee: ZF Lenksysteme Nacam GmbH (DE)

( * ) Notice: Subject to any disclaimer, the term of this patent is extended or adjusted under 35 U.S.C. 154(b) by 0 days.

(21) Appl. No.: 10/899,848

(22) Filed: Jul. 27, 2004

(65) Prior Publication Data

US 2004/0261565 A1    Dec. 30, 2004

Related U.S. Application Data

(63) Continuation of application No. PCT/DE03/02402, filed on Jul. 17, 2003.

(30) Foreign Application Priority Data

Jul. 30, 2002    (DE) ................. 102 34 514

(51) Int. Cl.
*B62D 1/184* (2006.01)
(52) U.S. Cl. ....................... 74/493; 280/775
(58) Field of Classification Search .......... 74/493; 280/775
See application file for complete search history.

(56) References Cited

U.S. PATENT DOCUMENTS

| | | | |
|---|---|---|---|
| 4,732,050 A * | 3/1988 | Vollmer | 74/493 |
| 5,117,707 A * | 6/1992 | Kinoshita et al. | 74/493 |
| 5,199,319 A * | 4/1993 | Fujiu | 74/493 |
| 5,555,772 A * | 9/1996 | Schneider | 74/493 |
| 5,655,413 A * | 8/1997 | Barton | 74/493 |
| 5,743,150 A * | 4/1998 | Fevre et al. | 74/493 |
| 5,787,759 A | 8/1998 | Olgren | |
| 5,988,679 A * | 11/1999 | Schelling et al. | 280/775 |
| 6,394,493 B1 * | 5/2002 | Kieserling et al. | 280/775 |

(Continued)

FOREIGN PATENT DOCUMENTS

DE    198 05 289    8/1998

(Continued)

*Primary Examiner*—William C. Joyce
(74) *Attorney, Agent, or Firm*—McGlew & Tuttle, PC

(57) ABSTRACT

A motor vehicle steering column with a positioning device (1) is provided as well as a positioning device for motor vehicle steering columns. The positioning device has a first bracket (3) for connecting the positioning device (1) with the motor vehicle steering column (2), a second bracket (4) for connecting the positioning device (1) with the body of a vehicle, a toothed rack (5) arranged at the first bracket (3) with at least one row of locking teeth and alignment of the row of locking teeth in parallel to a first direction of adjustment, a second toothed rack (6) arranged at the second bracket (4) with at least one row of locking teeth and alignment of the row of locking teeth in parallel to a second direction of adjustment, with a first locking element with at least one row of locking teeth, which can be caused to mesh with the row of locking teeth of the first toothed rack (5), with a second locking element (8) with at least one row of locking teeth, which can be caused to mesh with the row of locking teeth of the second toothed rack, with a spacer for setting a defined distance of the second locking element (8) in relation to the first locking element, and with a clamping mechanism (10). The clamping mechanism (10) provides for the simultaneous locking and unlocking of the first and second (8) locking elements with the respective first (5) and second (6) toothed rack.

14 Claims, 4 Drawing Sheets

U.S. PATENT DOCUMENTS 6,450,531 B1 * 9/2002 Rinker et al. ................ 280/775
6,695,349 B1 * 2/2004 Bohlen et al. ............... 280/775
6,792,824 B1 * 9/2004 Jolley et al. .................. 74/493

FOREIGN PATENT DOCUMENTS

EP 0 836 981 4/1998
GB 2 352 285 1/2001

* cited by examiner

POSITIONING DEVICE FOR MOTOR VEHICLE STEERING COLUMNS

CROSS REFERENCE TO RELATED APPLICATION

This is a continuation of and claims the benefit (35 U.S.C. §120 and 365(c)) of copending International Application PCT/DE 2003/002402 of Jul. 17, 2003, which designated inter alia the United States and which claims the priority of German Application DE 102 34 514.7 of Jul. 30, 2002. The entire contents of each application is hereby incorporated by reference in its entirety.

FIELD OF THE INVENTION

The present invention pertains to a positioning device for an adjustable motor vehicle steering column.

BACKGROUND OF THE INVENTION

For improved driving comfort, modern motor vehicles are equipped with adjustable motor vehicle steering columns. These steering columns can be adjusted both in height and along the axis of the steering column. With these steering columns, the motor vehicle driver can bring the steering wheel into a position that is comfortable for him. To set the desired position of the steering wheel, the driver of the vehicle releases the locking of the steering column at a positioning device. After repositioning the steering wheel, the steering column is again locked at the positioning device.

In the majority of vehicle models, the motor vehicle steering column, hereinafter generally called steering column, is led through the leg room of the driver of the motor vehicle or driver. To avoid injuries to the driver in case of an accident, it shall be borne in mind that the space required by the positioning device in the leg room of the driver shall be small enough to rule out injuries to the driver at the positioning device.

The positioning device of an adjustable motor vehicle steering column permits the steering wheel to be displaced axially in relation to the steering axle and in the vertical direction. The positioning device must operate reliably and must not compromise the accurate steering of a motor vehicle. In particular, it must not be the cause of undesired steering corrections. A play in the mechanical parts of the setting device is unacceptable, and at least the locking must take place reliably for both displacement directions simultaneously. Therefore, it must not happen that one of the two displacement directions is still or already locked while the other is already or still unlocked.

SUMMARY OF THE INVENTION

The object of the present invention is therefore to provide a positioning device for a motor vehicle steering column, which guarantees reliable operation and does not represent a potential for injury.

The object is accomplished according the present invention with a positioning device for a motor vehicle steering column with a first bracket for connecting the positioning device with the motor vehicle steering column and a second bracket for connecting the positioning device with the body of a motor vehicle. A first toothed rack is arranged at the first bracket with at least one row of locking teeth and alignment of the rows of the locking teeth in the direction of a first direction of adjustment. A second toothed rack is arranged at the second bracket with at least one row of locking teeth and with alignment of the row of the locking teeth in the direction of a second direction of adjustment. A first locking element has at least one row of locking teeth, which can be caused to mesh with the row of said locking teeth of the first toothed rack. A second locking element has at least one row of locking teeth, which can be caused to mesh with the row of said locking teeth of the second toothed rack. A spacer is provided for setting a defined distance between the second locking element in relation to the first locking element. A clamping mechanism is provided for the simultaneous locking and unlocking of the first and the second locking element with the respective first and second toothed rack.

The first toothed rack is arranged at the first bracket with at least one row of locking teeth with the row of locking teeth being directed in the direction of, e.g., in parallel to a first direction of adjustment, with the second toothed rack arranged at the second bracket with at least one row of locking teeth. This row of locking teeth is directed in the direction of, e.g., in parallel to a second direction of adjustment. The at least one row of locking teeth of the first locking element can be caused to mesh with the row of locking teeth of the first toothed rack. The second locking element with at least one row of locking teeth can be caused to mesh with the row of locking teeth of the second toothed rack. The spacer provides spacing of the second locking element at a defined distance from the first locking element. The clamping mechanism simultaneously locks and unlocks the first and second locking elements with the respective first and second toothed racks.

The object stated above is accomplished, furthermore, with a motor vehicle steering column with a positioning device according to the present invention, wherein the first direction of adjustment of the positioning device is directed axially to the motor vehicle steering column and the second direction of adjustment of the positioning device is directed at right angles to the axis of the motor vehicle steering column or along an arc around a center of gravity.

The arrangement of the toothed racks at the brackets of the positioning device makes it possible to design the device as a compact device with a low injury potential. Reliable operation is achieved by the advantageous synchronous locking and unlocking of both directions of adjustment by the defined distance between the two locking elements and by the clamping mechanism acting simultaneously on both locking elements.

Depending on the manufacturing tolerances of the elements of the positioning device according to the present invention, the necessary distance between the two locking elements may vary from one finished positioning device to the next. The position of the second locking element on the spacer is therefore advantageously adjustable at least once. The position of the second locking element on the spacer may be adjusted by means of a screw thread connection, a single-time press-on operation, a spring washer or by compressing the material.

The adjustment of the position of the second locking element on the spacer can be performed in the outer area of the positioning device for a simple and uncomplicated adjustment.

Simultaneous locking and unlocking of the first and second locking elements with the respective first and second toothed racks can be achieved effectively and advantageously with a bar-shaped extension of the clamping mechanism, the bar-shaped extension being guided movably by the first and second brackets, the first and second toothed racks, the first and second locking elements and the spacer. To limit the movement of elements of the positioning device which can be displaced on the bar-shaped extension beyond an end of the bar-shaped extension, the extension advantageously has a securing element. A defined guiding of the locking elements for locking and unlocking is advantageously achieved in a simple manner with a compression spring, by means of which the first and second locking elements are held pressed against the securing element of the bar-shaped extension.

A compact design and a low rate of error during the assembly of the positioning device according to the present invention is achieved by the first toothed rack and the first bracket and/or the second toothed rack and the second bracket together forming a component each. In addition, less expensive manufacture of the positioning device can be achieved by this integration of the toothed racks in the respective bracket.

The second direction of adjustment of the positioning device preferably makes possible the height or tilt adjustment of the motor vehicle steering column, so that the steering wheel can be positioned ergonomically for the driver.

The present invention will be explained in greater detail below on the basis of exemplary embodiments with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
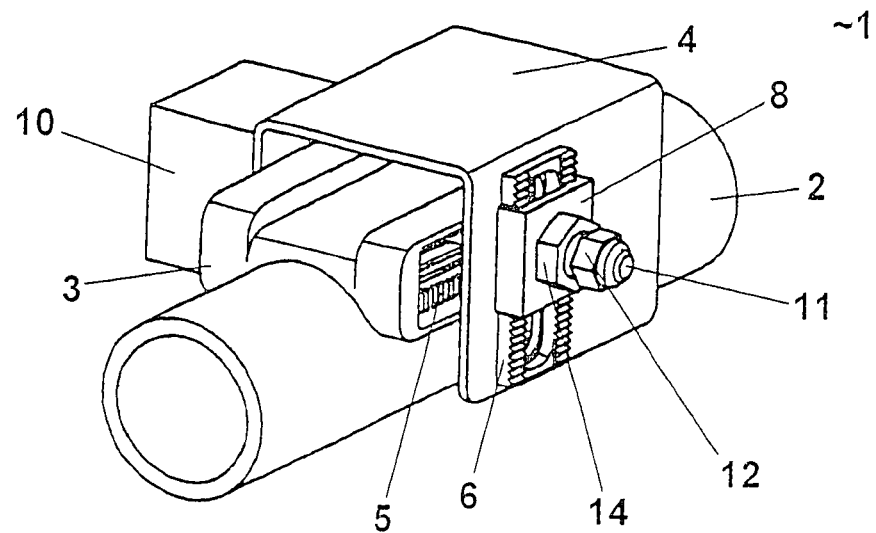
FIG. 1 is an isometric view of a motor vehicle steering column with a positioning device according to the present invention.

FIG. 1 shows a preferred embodiment of a positioning device 1 according to the present invention, which is arranged at the steering column body 2 or the column jacket 2 of a motor vehicle steering column. The axis of the jacket corresponds to the axis of the motor vehicle steering column. A first bracket 3 is used as the steering column bracket to fasten the positioning device 1 at the steering column, e.g., via a mechanical connection with the steering column body 2 or a steering column jacket 2. As is shown in FIGS. 1 through 7, the steering column bracket 3 may be designed as part of the steering column body 2 or the column jacket 2.

With the aim of simpler representation of the facts according to the present invention, the term steering column will hereinafter also be used as a synonym for a steering column body 2 or a steering column jacket 2.

The steering column 2 and the steering column bracket 3 are surrounded by a second bracket, the body bracket 4, which is used to fix the positioning device at the body of a motor vehicle. The legs of the U-shaped body bracket 4 are in contact with the front surfaces of the steering column bracket 3 in the mounted state of the positioning device 1, as can be determined from FIGS. 5 and 6.

Figure 2:
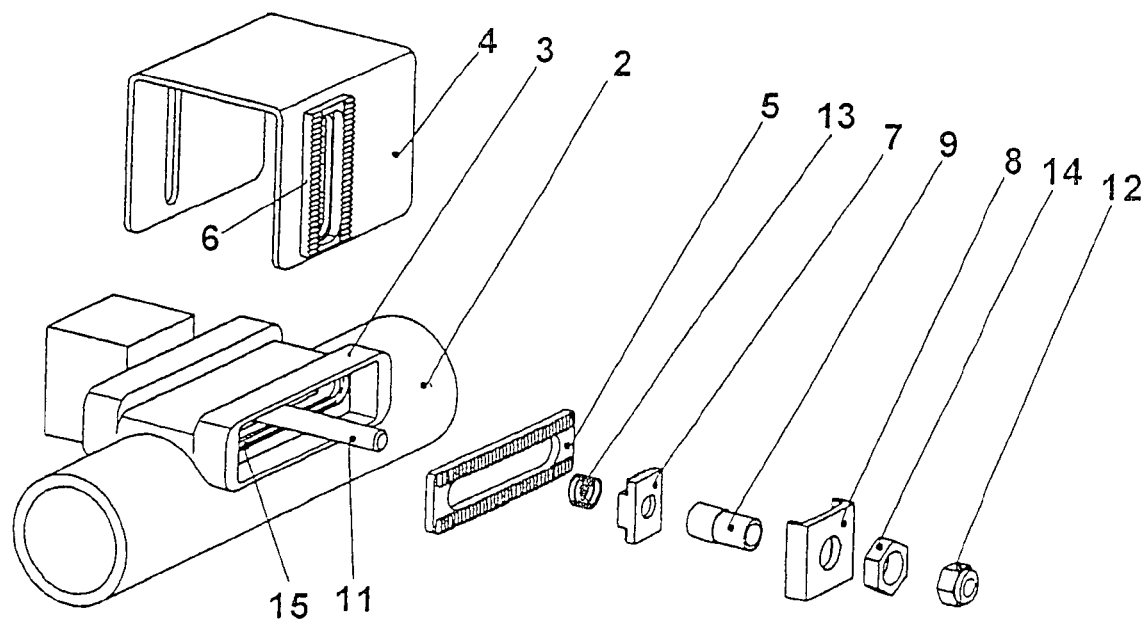
FIG. 2 is an exploded view of the components of a positioning device according to the present invention.
Figure 3:
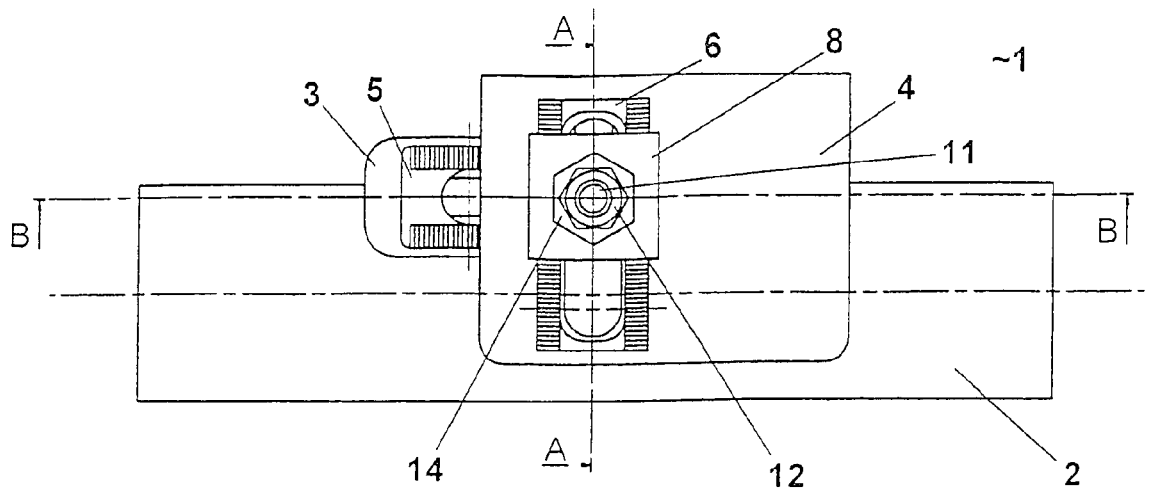
FIG. 3 is a side view of a motor vehicle steering column with a positioning device according to the present invention.
Figure 4:
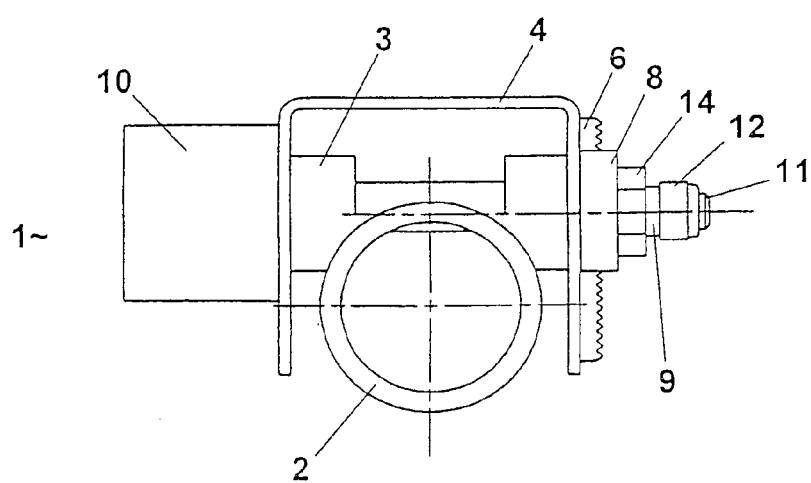
FIG. 4 is a front view of a motor vehicle steering column with a positioning device according to the present invention.
Figure 5:
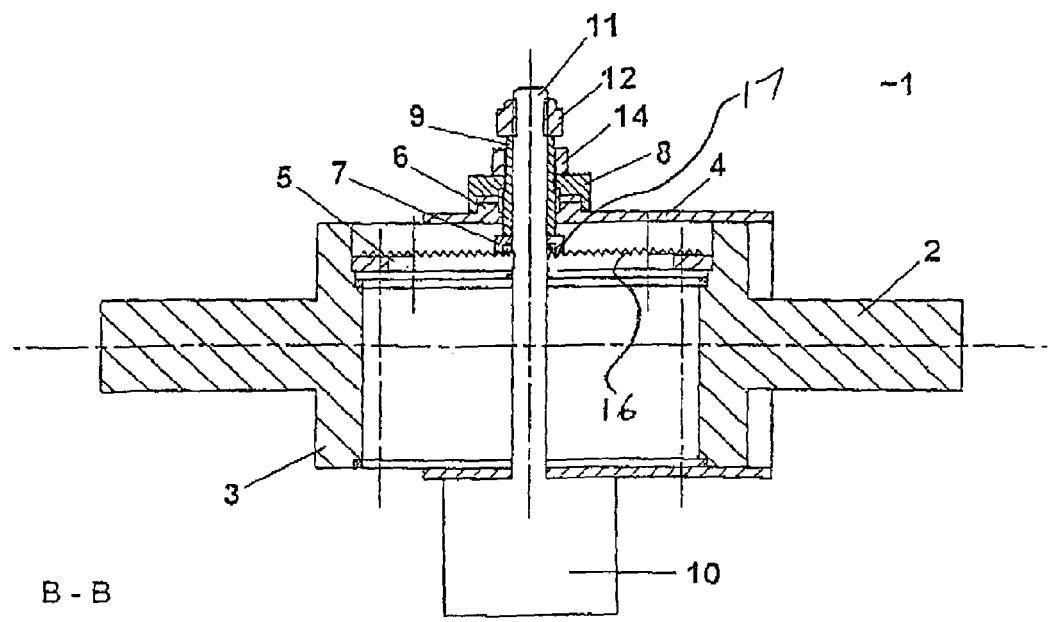
FIG. 5 is a sectional view of a motor vehicle steering column with a positioning device according to the present invention.

The steering column bracket 3 has a through cutout at right angles to the steering column axis, whose longitudinal extension is arranged in parallel to the steering column axis. As can be seen in FIG. 2, an extension 11 of a suitable clamping mechanism 10 can be led through this cutout and displaced in parallel to the steering axle of the motor vehicle.

On the side facing the looking mechanism of the positioning device, the steering column bracket 3 has a cutout, whose lateral dimensions are suitable for receiving the first, axial toothed rack 5, and whose depth is great enough to receive the axial toothed rack 5 and a first locking element 7 located thereon. The toothed rack 5 has locking teeth 16, and the locking element has locking teeth 17. This also applies to the case in which the first locking element 7 and the toothed rack for the axial displacement 5 are spaced from one another to the extent that the locking teeth 16, 17 of the two components cannot touch each other even during a displacement. One or more rows of the locking teeth 16, 17 are formed on the toothed rack 5 and on the locking element 7. The locking teeth 17 of the locking element 7 have a shape complementary to that of the locking teeth 16 of the toothed rack 5.

An elongated and through cutout, or hole, in the toothed rack 5 permits the bar-shaped extension 11 of the clamping device 10, e.g., a bolt, to be passed through. The lateral dimensions of this cutout, or hole, are somewhat larger than those of the through cutout of the steering column bracket 3, so that a compression spring 13 can be guided in the elongated cutout of the axial toothed rack 5 on the steering column bracket 3. The external diameter of the spring 13 is greater than the opening of the through cutout in the steering column bracket 3 at right angles to the axis of the steering column.

An elongated groove in the bottom of the front-side cutout of the steering column bracket 3 is used to receive a sliding disk 15, on which the compression spring 13 can be displaced in parallel to the steering column axis along the through cutout of the steering column bracket 3.

As an alternative to the embodiment shown, the axial toothed rack 5 may be designed as part of the steering column bracket 3, as a result of which the number of components is reduced. The cost reduction thus achieved in the manufacture of the components of the positioning device is in addition to the cost reduction resulting from the simplified mounting and the lower frequency of errors during the assembly of the positioning device.

The body bracket 4 is preferably designed as a U-shaped sheet metal cheek, with two longitudinal slots located opposite each other in the legs of the bracket. The longitudinal direction of the slots is parallel to the direction of the legs of the bracket and, in the mounted state of the positioning device, at right angles to the through cutout of the steering column bracket 3. A second, vertical toothed rack 6 is arranged at one of the legs such that the longitudinal slot of this leg is located centrally in a through, elongated cutout of the vertical toothed rack 6. Analogously to the axial toothed rack, the vertical toothed rack 6 is formed with one or more rows of locking teeth 18, whose shape is complementary to that locking teeth 19 of a conesponding vertical locking element 8.

When considering the base of the U-shaped body bracket 4 as the reference plane, the steering column 2 can be moved along the longitudinal slots in the legs of the body bracket 4 away from and toward this reference plane and displaced along the through cutout in the steering column bracket 3 in parallel to this reference plane.

In the mounted state of the positioning device, the bar-shaped extension 11, for example, a bolt, arranged at a suitable clamping device 10, passes through the elongated through cutouts of the steering column bracket 3 and the axial toothed rack 5. The components of the locking mechanism of the positioning device are pushed into their positions via the free end of the bolt. The components of the locking mechanism include the sliding disk 15, the compression spring 13, the first locking element 7 for the axial locking, the spacer 9 for setting the defined distance of the second locking element 8 for the vertical locking in relation to the first locking element 7, and a securing element 12. Vertical means here a direction at right angles to the longitudinal axis of the steering column 2 and in parallel to the direction of the leg of the U-shaped body bracket 4. The securing element 12 limits the movement of the components arranged movably on the bolt 11 in the direction of its free end.

Prior-art constructions may be used as the clamping mechanism 10. When the clamping mechanism 10 is released, the bolt 11 is displaced in the direction of its free end. The available length of the bolt 11 in the locking mechanism becomes greater as a result. Components mounted movably on the bolt can thus be displaced in relation to the components arranged in a fixed manner on the brackets. In particular, the locking elements can now be pushed out of the toothed racks. When the clamping mechanism 10 is closed, the locking elements are pressed by the bolt onto the toothed racks.

When the clamping mechanism 10 is released, the steering column 2 can be displaced in relation to the body bracket 4. The design makes possible a vertical displacement with reference to the base of the U-shaped body bracket 4 as well as an axial displacement in the direction of the steering axle. Displacement of the steering column 2 is prevented from occurring in the clamped state of the clamping mechanism 10 by the locking mechanism, as will be described in greater detail below on the basis of FIG. 7.

Figure 6:
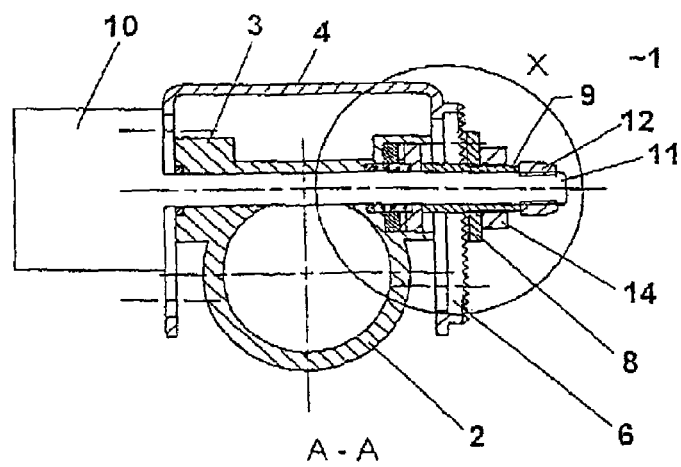
FIG. 6 is a cross section of a motor vehicle steering column with a positioning device according to the present invention.
Figure 7:
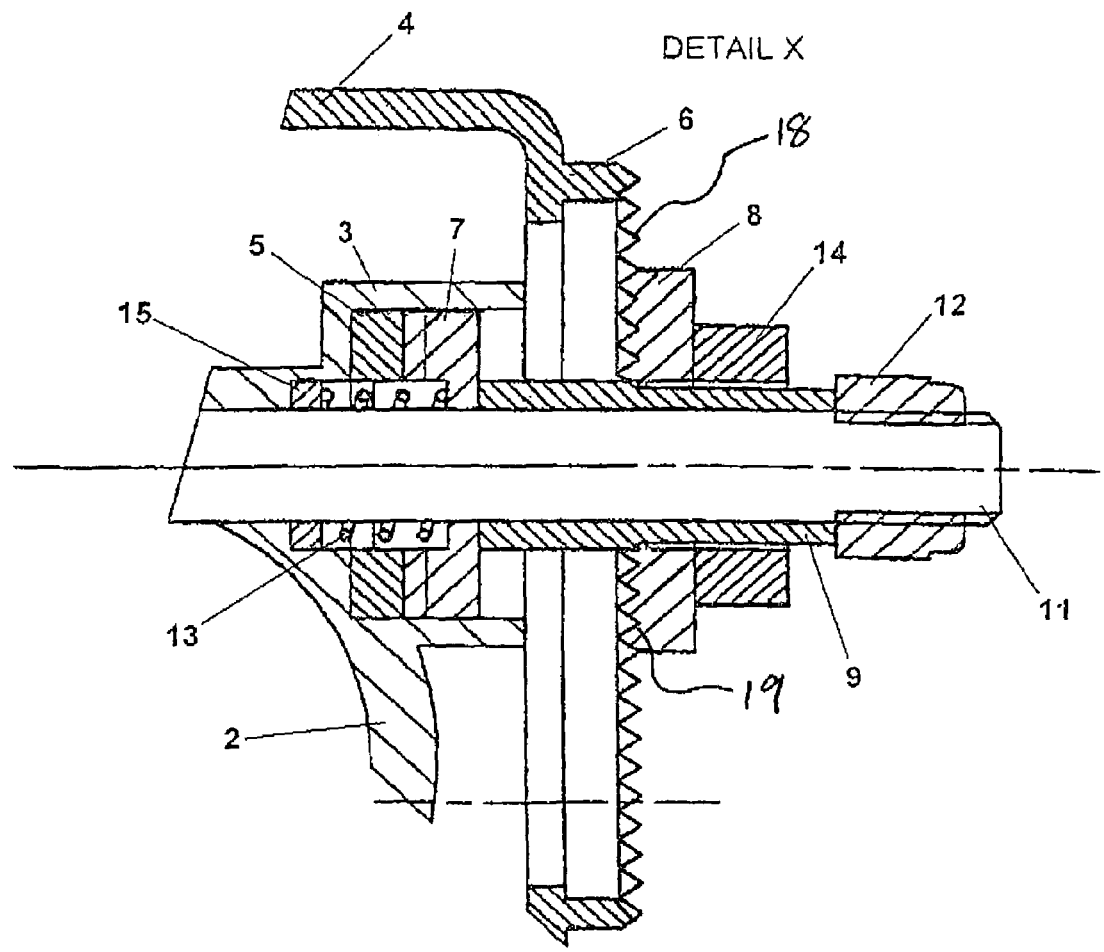
FIG. 7 is a detail of the cross section of the adjusting mechanism of a positioning device according to the present invention for a motor vehicle steering column.

FIG. 7 shows a detail of the locking mechanism of the positioning device 1 according to the present invention, whose cross section is shown in FIG. 6. The bolt 11 of the clamping mechanism 10 forms the central axis of the locking mechanism. The clamping mechanism 10 is supported against a leg of the motor vehicle bracket 4, so that a force can be exerted on the elements of the locking mechanism during the closing of the clamping mechanism.

FIG. 7 shows the locking mechanism in the closed state. The locking elements 7 and 8 lie in this closed state on the respective toothed racks 5 and 6 such that the teeth of the locking elements mesh with the locking teeth on the toothed racks in a positive-locking manner. "Positive-locking" means here that the locking teeth of the locking elements are completely in contact with the opposite locking teeth of the toothed rack on the contact surfaces provided by the design (to the extent possible). In particular, the term "positive-locking" shall be understood to be different from an (incomplete) meshing of the rows of locking teeth, during which the locking teeth of the locking elements are only set with the locking teeth of the toothed rack rows to the extent that even though displacement of the locking elements along the row of locking teeth of the toothed rack is prevented from occurring, the contact surfaces of the locking teeth located opposite each other are in contact with one another only incompletely if at all. A doubly positive-locking locking, i.e., simultaneous positive locking of both the axial and vertical locking elements, is necessary for the reliable locking of the motor vehicle steering column 2.

The distance between the axial toothed rack 5 and the vertical toothed rack 6 must therefore correspond to the distance between the axial locking element 7 and the vertical locking element 8. When the locking is released, the locking elements 7, 8 are pushed out of the teeth of the respective toothed rack 5 and 6 until the locking teeth of the two parts cease to be set or the tips of the locking teeth of the two parts 5 and 7 as well as 6 and 8 are at a short distance from one another. This operation is also called unlocking.

If the distance between the locking elements 7 and 8 does not correspond to the distance between the toothed racks 5 and 6, one of the two may already have been unlocked, while the other is still in a meshing state. Provisions are therefore made according to the present invention to adapt the distance between the two locking elements 7 and 8 for both modes of operation, i.e., the locking and the unlocking, to the distance between the two toothed racks 5 and 6. Simultaneous positive locking of the axial as well as vertical locking elements in case of locking and simultaneous unlocking of both locking elements are thus achieved. A locking element is defined as a structural unit comprising a toothed rack and the corresponding locking element.

With reference to the view in FIG. 7, the bolt 11 is displaced to the right when the clamping mechanism 10 is released. As a result, the compression spring 13 can expand to the right and presses the locking element 7 to the right. The locking element 7 adjoins on its right-hand outside the spacer 9, on which the vertical locking element 8 is fastened. The displacement of the axial locking element 7 is therefore directly transmitted via the spacer 9 to the vertical locking element 8; in other words, both locking elements are displaced in parallel to one another to the right away from the respective toothed racks. The displacement of the unit from the locking elements 7 and 8 as well as from the spacer 9, which is brought about by the compression spring 13, is limited by the securing element 12, which is a stop for the spacer 9. Regardless of the position of the bolt 11, the position of the two locking elements 7 and 8 and of the spacer 9 in relation to the free end of the bolt therefore remains unchanged.

A certain range of variation must always be accepted in the dimensions in the manufacture of mechanical components. The distances of the toothed racks 5 and 6 cannot therefore always be considered to be constant within a production series. Thus, it is not guaranteed for all units of a line of products that the two locking elements have positive locking in the locked state or that one of the locking elements does not mesh in the unlocked case.

The distance between the two locking elements is therefore adjustable in a special embodiment of the present invention. The adjustment is preferably performed once in the course of the mounting of the positioning device. To ensure uncomplicated, simple adjustment of the distance between the two locking elements 7 and 8, it must be guaranteed that the parts needed for the adjustment are arranged in an easily accessible manner.

In the embodiment of a positioning device according to the present invention shown in FIG. 7, the spacer 9 is designed as a bushing with a screw thread on the outer jacket surface. The vertical locking element 8 has corresponding internal threads, so that the position of the locking element 8 on the spacer 9 can be changed by rotating the spacer in the internal thread of the locking element. The spacer 9 as well as the vertical locking element 8 are accessible on the outside of the positioning device 1 in the mounted state of the positioning device, so that adjustment can be performed with simple means. For adjustment, the vertical locking element is positioned on the spacer 9 before the assembly of the positioning device such that taking into account the possible manufacturing tolerances, the distance between the two locking elements 7 and 8 is always greater than the distance between the two toothed racks 5 and 6. Furthermore, a lock nut 14 is premounted on the spacer 9 for the later fixation of the set position of the locking element 8. After the assembly of the positioning device 1, the clamping mechanism is brought into the locked position, so that the axial locking element 7 is in contact with the axial toothed rack 3 in a positive-locking manner. The vertical locking element comprising the toothed rack 6 and the locking element 8 is still located at this state either in the completely unlocked state or in the meshing state. By rotating the spacer 9 with a simple tool or manually, the locking element 8 is now displaced in the direction of the toothed rack 6 on the spacer 9 until a positive-locking connection becomes established between the locking teeth of the locking element 8 and the toothed rack 6, which said locking teeth are located opposite each other. This position, thus set, is fixed by tightening the lock nut 14 at the locking element 8. The vertical locking mechanism is locked and unlocked now in parallel and simultaneously with the axial locking mechanism.

Since the position of the vertical locking element 8 on the spacer 9 must be fixed at a single time only, the adjustment may also be performed with other means, e.g., by pressing the locking element 8 onto the spacer 9 a single time. As an alternative to this, the locking element 8 may also be fixed on the spacer 9 by means of material compression. The fixation of the vertical clamping element 8 on the spacer 9 is performed with a spring washer in a very simple manner and at low cost. The spring washer is pressed for this purpose on the spacer 9 against the locking element 8 until the latter comes into contact with the toothed rack 6 in a positive-locking manner. The design of the spring washer prevents the locking element from slipping in the direction of the free end of the bolt 11. The fit between the locking element 8 and the spacer 9 is designed such that displacement of the locking element requires the exertion of a certain force, so that the locking element 8 cannot be displaced by itself on the spacer 9 when the clamping mechanism is released.

The doubly positive-locking locking of the positioning device according to the present invention results, as can be determined from FIGS. 1 through 7, in an extremely compact design, which is characterized, in particular, by a very short distance between the clamping axis defined by the bolt 11 of the clamping mechanism 10 and the axis of the steering column. A risk for injury in case of an accident is therefore ruled out especially in the knee area of a driver, which area is especially at risk.

The possibility of adjusting the distance between the two locking elements 7 and 8 in relation to one another from the outside makes it possible to use inexpensive and weight-optimized cast constructions. The axial toothed rack 5 may be inserted into the cast housing of the steering column bracket 3, as can be seen especially in FIG. 5, and it therefore does not require any additional fixation by means of, e.g., screws or welding. Moreover, the integration of the axial toothed rack reduces the probability of error in the assembly of the positioning device.

While a specific embodiment of the invention has been shown and described in detail to illustrate the application of the principles of the invention, it will be understood that the invention may be embodied otherwise without departing from such principles.

APPENDIX

List of Reference Numbers:
1 Positioning device
2 Steering column body or column jacket of a motor vehicle steering column
3 First bracket (steering column bracket)
4 Second bracket (body bracket)
5 First toothed rack
6 Second toothed rack
7 First locking element
8 Second locking element
9 Spacer
10 Clamping mechanism
11 Bar-shaped extension (bolt)
12 Securing element
13 Compression spring
14 Locknut
15 Sliding disk

What is claimed is:

1. A positioning device for a motor vehicle steering column, the positioning device comprising:
a first bracket for connecting the positioning device with the motor vehicle steering column;
a second bracket for connecting the positioning device with the body of a motor vehicle;
a first toothed rack arranged at the first bracket with a row of first rack locking teeth and with an alignment of the row of said first rack locking teeth in the direction of a first direction of adjustment;
a second toothed rack arranged at the second bracket with a row of second rack locking teeth and with an alignment of the row of said second rack locking teeth in the direction of a second direction of adjustment;
a first locking element with a row of first element locking teeth, which can be caused to mesh with the row of said first rack locking teeth;
a second locking element with a row of first element locking teeth, which can be caused to mesh with the row of said second rack locking teeth;
a spacer for setting a defined distance between the second locking element in relation to the first locking element;
a clamping mechanism for the simultaneous locking and unlocking of the first and said second locking element with the respective first toothed rack and second toothed rack wherein said second toothed rack and said first locking element are arranged between said first bracket and said second locking element and said first toothed rack is arranged between said first bracket and said first locking element; and
a compression spring arranged between said first bracket and said first locking element.

2. A positioning device in accordance with claim 1, wherein the position of the second locking element with respect to the spacer is adjustable at least once.

3. A positioning device in accordance with claim 2, wherein the position of the second locking element with respect to the spacer can be adjusted by one of a screw thread connection, a single-time press-on operation, a spring washer and material compression.

4. A positioning device in accordance claim 2, wherein the adjustment of the position of the second locking element with respect to the spacer can be performed from an outer area of the positioning device.

5. A positioning device in accordance with claim 1, wherein said clamping mechanism includes a bar-shaped extension guided movably by said first bracket and said second bracket, said first toothed rack and said second toothed rack, said first locking element and said second locking element and said spacer.

6. A positioning device in accordance with claim 5, wherein the bar-shaped extension has a securing element for limiting a movement of said elements of the positioning means, which are displaceable on said bar-shaped extension, beyond an end of said bar-shaped extension.

7. A positioning device in accordance with claim 6, wherein said bar-shaped extension securing element and said first locking element and said second locking element are held pressed against said securing element by said compression spring.

8. A positioning device in accordance with claim 5, wherein:

said first bracket is part of one of a steering column body and a steering column jacket of the steering column;

said first bracket defines an elongated through hole with a longitudinal extension arranged substantially parallel with an axis of the steering column;

said extension extends through said hole.

9. A positioning device in accordance with claim 1, wherein said first toothed rack and said first bracket together form a component.

10. A positioning device in accordance with claim 1, wherein said second toothed rack and said second bracket together form a component.

11. A positioning device in accordance with claim 1, wherein:

said first bracket is part of one of a steering column body and a steering column jacket of the steering column.

12. A positioning device in accordance with claim 1, wherein:

said second toothed rack and said first locking element are arranged between said first toothed rack and said second locking element.

13. A positioning device in accordance with claim 1, wherein:

said first bracket is part of one of a steering column body and a steering column jacket of the steering column.

14. A positioning device in accordance with claim 1, wherein:

said spacer connects said second locking element to the first locking element at said defined distance.

* * * * *